(12) United States Patent
Lang

(10) Patent No.: US 9,694,362 B2
(45) Date of Patent: Jul. 4, 2017

(54) COMPOSTING GARBAGE DISPOSAL

(71) Applicant: David Paul Lang, Napa, CA (US)

(72) Inventor: David Paul Lang, Napa, CA (US)

( * ) Notice: Subject to any disclaimer, the term of this patent is extended or adjusted under 35 U.S.C. 154(b) by 207 days.

(21) Appl. No.: 14/545,770

(22) Filed: Jun. 18, 2015

(65) Prior Publication Data
US 2016/0369485 A1 Dec. 22, 2016

(51) Int. Cl.
| | | |
|---|---|---|
| *B02C 19/22* | (2006.01) | |
| *B30B 9/12* | (2006.01) | |
| *B09B 3/00* | (2006.01) | |
| *B30B 9/26* | (2006.01) | |
| *C05F 17/02* | (2006.01) | |
| *E03C 1/26* | (2006.01) | |

(52) U.S. Cl.
CPC .............. *B02C 19/22* (2013.01); *B09B 3/00* (2013.01); *B30B 9/121* (2013.01); *B30B 9/127* (2013.01); *B30B 9/128* (2013.01); *B30B 9/26* (2013.01); *C05F 17/02* (2013.01); *E03C 1/26* (2013.01)

(58) Field of Classification Search
USPC ........................................ 241/46.013–46.016
See application file for complete search history.

(56) References Cited

U.S. PATENT DOCUMENTS

| | | | | |
|---|---|---|---|---|
| 3,188,942 A | * | 6/1965 | Wandel | ................ B01D 29/118 100/112 |
| 3,874,006 A | | 4/1975 | Ritter | |
| 4,761,235 A | | 8/1988 | Haentjens | |
| 4,847,927 A | | 7/1989 | Blanc | |
| 5,127,587 A | | 7/1992 | Johnson | |
| 5,129,590 A | | 7/1992 | Shinya | |
| 5,176,825 A | | 1/1993 | Hadjis | |
| 5,370,323 A | * | 12/1994 | Narao | ..................... B30B 9/121 100/117 |
| 5,413,705 A | | 5/1995 | Tammera | |
| 5,773,281 A | | 6/1998 | Ichikawa | |
| 7,954,739 B2 | * | 6/2011 | Shin-Ya | ............. B02C 18/0084 241/100 |
| 8,464,970 B2 | | 6/2013 | Ceru et al. | |

FOREIGN PATENT DOCUMENTS

| | | | | |
|---|---|---|---|---|
| JP | 2004174482 A | * | 6/2004 | ............... B09B 3/00 |
| JP | 2006212620 A | * | 8/2006 | ............ B02C 19/22 |

* cited by examiner

*Primary Examiner* — Mark Rosenbaum

(57) ABSTRACT

A composting garbage disposal for under sink use in a kitchen which separates food waste items into liquid and solid components. The liquid components are directed to a standard sewer or septic system. The solid components are directed to a removable storage bin. The food waste items are separated by use of a motor driven auger member which is in close proximity to the inside wall of a screened cup so that the liquid exits the screened portion of the cup and the solid exits through an aperture in the floor of the cup. A microprocessor circuit senses the strain on the drive motor and if the strain becomes excessive, automatically reverses the direction of the shaft and auger thereby releasing excess food waste that is causing the excess strain.

5 Claims, 3 Drawing Sheets

COMPOSTING GARBAGE DISPOSAL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of under sing garbage disposers and more specifically to a composting garbage disposer that separates liquid waste from solid waste.

Garbage disposals that are attached to the drain portion of a kitchen sink are well known. Typically they consist of a chamber located directly under the sink drain that includes a rapidly rotating blade at the base of the chamber that pulverizes waste food products and sends them into the sewer or septic system. However, Garbage disposers are tough on any sewage system, private or public—uneaten food does not biodegrade well. When on public sewer, municipalities spend millions of dollars to remove food particles from sewage water. This problem is even more pronounced when using a private septic system.

A number of inventors have thought about this problem and proposed methods of separating solid food partials from liquid matter and allowing the liquid matter to proceed to a sewer system and trapping the solid matter in a holding tank or bin.

However there are several deficiencies in the prior technology. Some of the earlier strainer designs require that the user physically remove the strainer and dump out the solids portion each time they are ground up. Other designs require complex mechanisms with rapidly spinning blades that pose a danger to the user. Others are hard to clean out, which needs to be done periodically.

BRIEF SUMMARY OF THE INVENTION

The primary object of the invention is to provide an under sink garbage separating device that causes liquid to enter the sewer system and solids to be stored as compost in a removable holding bin.

Another object of the invention is to provide an under sink garbage separating device that uses a relatively low speed, save auger assembly to masticate food related items and to force the solid portions of the items into a holding bin and to cause the liquid portion of the food items to enter the sewer system.

Another object of the invention is to provide an under sink garbage separating device that monitors motor strain and automatically reverses the direction of the output shaft to help relieve jammed food items.

A further object of the invention is to provide an under sink garbage separating device that automatically turns itself off after a predetermined amount of time.

Yet another object of the invention is to provide an under sink garbage separating device that allows the user to have access to the removable auger assembly for cleaning purposes.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a composting garbage disposal comprising: a material input chamber, a threaded sink ring member, an auger member, a screened cup member, a sink to threaded sink ring member fastening ring, a main housing, main housing retaining screws, a main housing gasket, a drive gear motor assembly, a motor to auger member connecting shaft, a main housing liquid outlet pipe, a main housing solids outlet pipe, a solids retaining vessel, an on switch, said threaded sink ring member having a flange that engages the center aperture of a standard kitchen sink, said sink to thread sink ring member held in place under said sink by said sink ring member fastening ring, said material input chamber being removable and replaceable and having tabs that engage apertures in said threaded sink ring member, said main housing attached to the outer wall of said threaded sink ring member via retaining screws, said main housing having an internal mid level floor that supports said screened cup member, said main housing having a lower portion under said mid level floor where said drive gear motor assembly resides, said auger member located in close proximity to the inside walls of said screened cup member, said auger driven by said drive gear motor assembly via said motor to auger member connecting shaft, said main housing gasket centrally located on said mid level floor and creating a waterproof seal for said motor to auger member connecting shaft, said main housing liquid outlet pipe exiting just above said mid level floor, said main housing solids outlet pipe exiting main housing just below said screened cup, said screened cup having a solid floor and having an aperture towards the perimeter of said solid floor, said solids outlet pipe attached at one end to said cup floor aperture, said solids outlet pipe terminating at said solids retaining vessel, and so that when a person inserts food waste into the said material input chamber, said food waste drops into said screened cup and is masticated by said auger member causing liquid from said food waste to exit said liquid outlet tube and solid from said food waste to exit into said solids outlet tube and into said solids retaining vessel.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
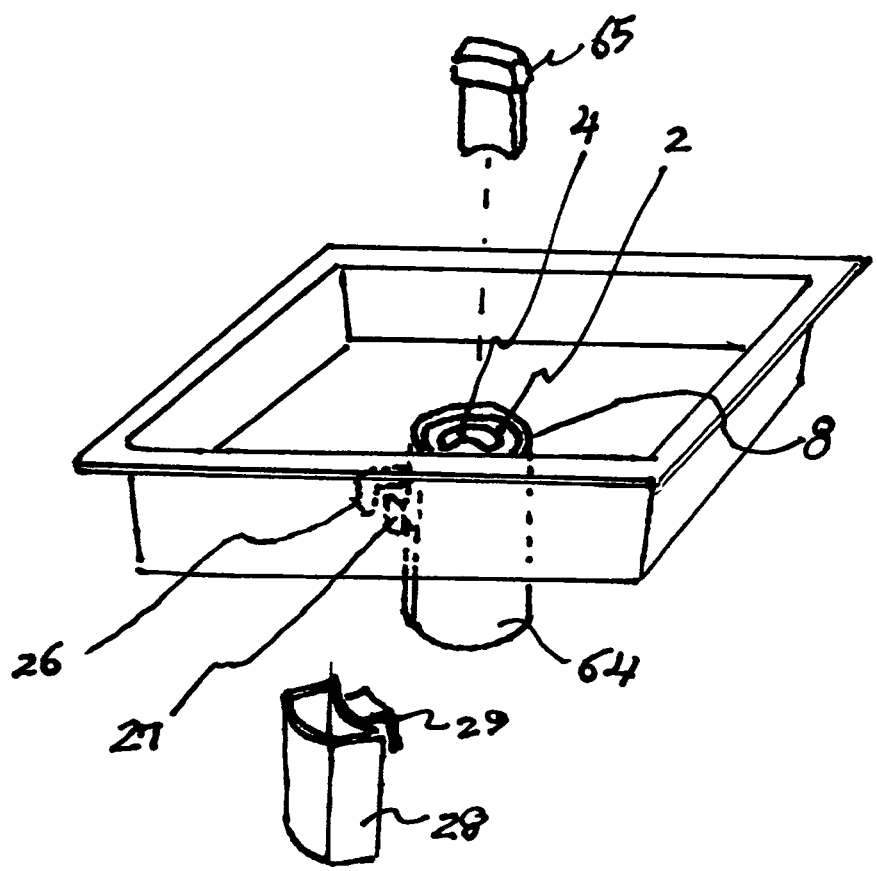
FIG. 1 is a perspective view of the invention installed on a sink

Referring now to FIG. 1 we see a perspective view of the invention attached to a standard kitchen sink 6. A sink connection ring 8 is held in place by a retaining nut 10 as shown in the front section view in FIG. 2. A waste deposit chamber 2 includes an aperture 4 that receives food scraps. A main housing 64 houses the remainder of the disposal assembly as will be described below. A compost storage bin 28 can be removably retained by handle 29 as it engages receiving bracket 27 located on the side of main housing 64. solids exit tube 26 transfers solid materials from the main housing 64 to the compost storage bin 28. Plunger member 65 helps push food scraps into the aperture 4 if the scraps do not get automatically sucked in by auger 16 which will be described below. The aperture 4 is small enough that even a child's hand can not fit inside it and therefore can not have access to the auger 16, as shown in FIG. 2, while is in operation.

Figure 2:
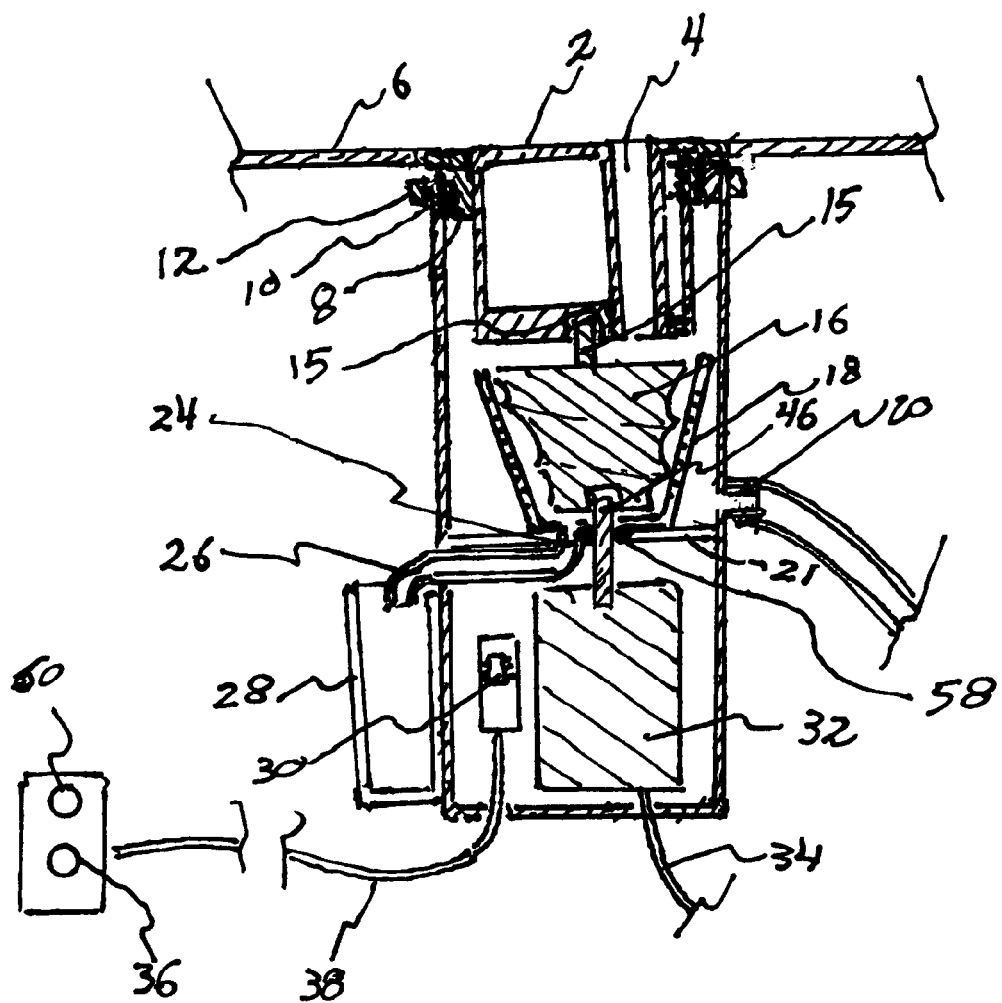
FIG. 2 is a front section view bisecting the invention.

FIG. 2 is a front section view of the invention. Sink connection ring 8 includes a flange that engages the perimeter of the central sink aperture 44 as shown in the exploded view in FIG. 3. A portion of the sink connection ring extends down below the sink and includes male threads that engage retaining nut 10 thereby locking the sink ring 8 onto the sink 6. A waste deposit chamber 2 is removably attached to the sink connection ring via a bayonet fitting 40, 42 as shown in the exploded view in FIG. 3. The main housing 64 is attached to the outside of retaining nut 10 by attachment bolts 12. The aperture 4 in the waste receiving chamber 2 allows food to enter on side of screened cup 18 and auger member 16. The auger member 16 is removable and replaceable and is held on the top by shaft 14 and shaft socket 15. The lower end of auger 16 is held by hex shaped shaft 56 entering socket 57. The hex shaft 56 becomes a round cross section 53, shown in FIG. 3, as it engages waterproof gasket 58. The opposite end of shaft 56 engages gear assembly 54 and electric motor 32. electric power cord 34 terminates in a 110 VAC power supply. The drive motor 32 is activated when the user presses momentary switch 36. This causes the motor and associated gear assembly and auger 16 to rotate for approximately sixty seconds and then automatically shut off. Therefore, the user does not have to stay by the switch 36 for an extended period of time. When food waste is inserted into aperture 4 is falls down and lodges itself between auger 16 and the inside wall of screened cup 18. The liquid portion of the food waste is forced out of the side, perforated screen walls of the cup. The solid portion of the food waste is forced down through an aperture of the solid floor of the cup 18 and out solids exit tube 26 and into compost bin 28. Liquid waste falls into the interior of main housing 64 and out of aperture 20 and into liquid exit tube 22. A mid level partition 21 separates the lower motor housing area from the upper cup 18 and auger 16 housing area. A microprocessor 30 within housing 64 can sense the strain level of the motor 32 by measuring amp rating. When a piece of waste matter is too large or hard for the auger 16 to process, the amp rating goes up and the microprocessor automatically tells the motor to reverse itself, to help dislodge the waste matter. Then the auger returns to its normal operating orientation. If the waste matter is still to hard to process, the reverse action repeats itself. If after several tries, the waste matter is still stuck between auger 16 and screen wall 18, a warning light 60 and warning alarm let the user know that he or she needs to access the auger 16 and pull it out to release and remove the waste food material. A waterproof switch 68 is activated when the waste deposit chamber 2 is in place and deactivated when the waste deposit chamber is removed thereby disabling the motor 32. This is a safety feature which precludes an individual from accidentally having his or her hand in close proximity to the auger while it is in operation. One of the benefits of the present design is that the auger only rotates at approximately eighty RPM and has no sharp cutting blades, so it is highly unlikely for a person to injure themselves even if the auger is operating while a person's hand is in close proximity.

Figure 3:
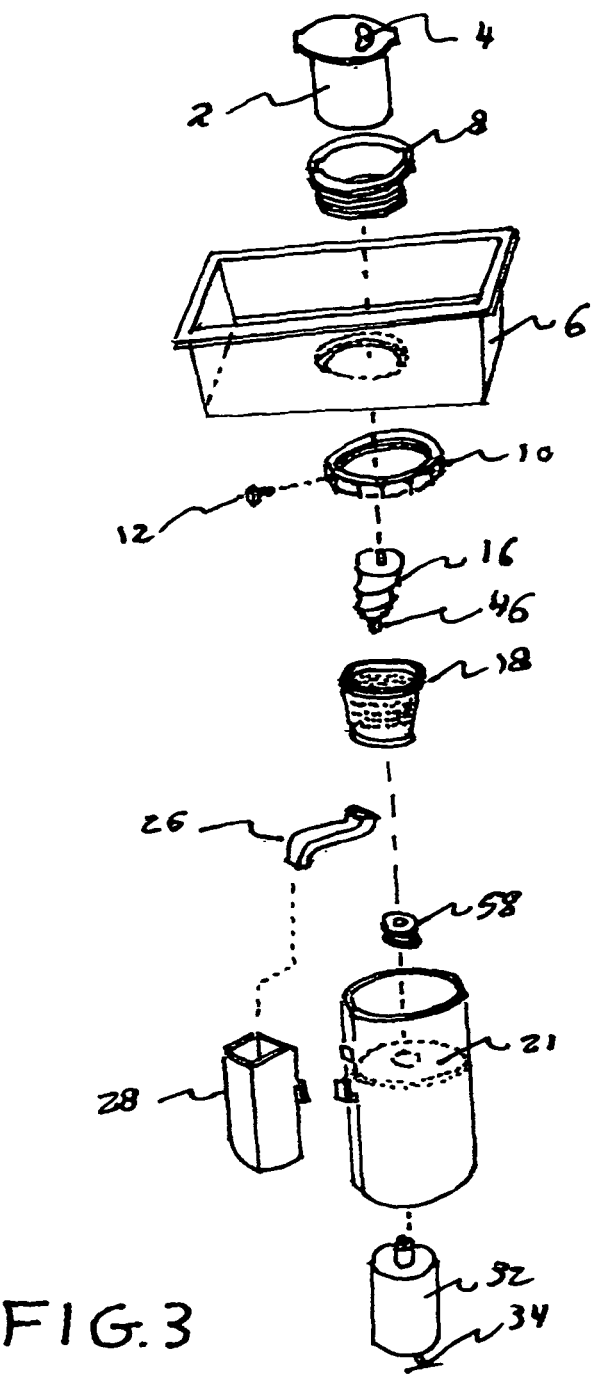
FIG. 3 is an exploded view of the invention.

FIG. 3 is an exploded view of the invention which further clarifies the description of all parts of the invention as described above. The motor power necessary to drive the auger is between 0.88 and 1.4 amps as compared with 2 4 amps of power required for traditional garbage disposals. Additionally, the user may channel the waste solids through an aperture in the wall of a house so that it makes its way out to a nearby garden area where it can be used as healthy compost material for growing garden plants.

While the invention has been described in connection with a preferred embodiment, is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A composting garbage disposal comprising:
   a material input chamber;
   a threaded sink ring member;
   an auger member;
   a screened cup member;
   a sink to threaded sink ring member fastening ring;
   a main housing;
   main housing retaining screws;
   a main housing gasket;
   a drive gear motor assembly;
   a motor to auger member connecting shaft;
   a main housing liquid outlet pipe;
   a main housing solids outlet pipe;
   a solids retaining vessel;
   an on switch;
   said threaded sink ring member having a flange that engages the center aperture of a standard kitchen sink;
   said threaded sink ring member held in place under said sink by said sink-to-threaded sink ring member fastening ring;
   said material input chamber being removable and replaceable and having tabs that engage apertures in said threaded sink ring member;
   said main housing attached to the outer wall of said threaded sink ring member via said retaining screws;
   said main housing having an internal mid level floor that supports said screened cup member, said main housing having a lower portion under said mid level floor where said drive gear motor assembly resides;
   said auger member located in close proximity to the inside walls of said screened cup member;
   said auger driven by said drive gear motor assembly via said motor to auger member connecting shaft;
   said main housing gasket centrally located on said mid level floor and creating a waterproof seal for said motor to auger member connecting shaft;

said main housing liquid outlet pipe exiting just above said mid level floor;

said main housing solids outlet pipe exiting main housing just below said screened cup;

said screened cup having a solid floor and having an aperture towards the perimeter of said solid floor;

said solids outlet pipe attached at one end to said cup floor aperture;

said solids outlet pipe terminating at said solids retaining vessel; and so that when a person inserts food waste into the said material input chamber, said food waste drops into said screened cup and is masticated by said auger member causing liquid from said food waste to exit said liquid outlet tube and solid from said food waste to exit into said solids outlet tube and into said solids retaining vessel.

2. A composting garbage disposal as claimed in claim 1 further comprising a microprocessor circuit that senses the strain on said drive gear motor assembly and automatically causes said motor shaft to reverse to allow excess food waste to become dislodged from the space between said auger member and said screened cup and then for said motor shaft to return to its normal operating rotating.

3. A composting garbage disposal as claimed in claim 1 further comprising a momentary on switch which activates said drive motor a fixed period of time and then automatically turns off said drive motor.

4. A composting garbage disposal as claimed in claim 1 wherein said material input chamber and said auger member are removable and replaceable.

5. A composting garbage disposal as claimed in claim 1 further comprising a waterproof reed switch built into said main housing that can sense whether said material input chamber is in place, and if not, will not allow said drive motor to operate.

* * * * *